(12) United States Patent
Kitsunai

(10) Patent No.: US 11,335,298 B2
(45) Date of Patent: May 17, 2022

(54) DISPLAY CONTROL APPARATUS, DISPLAY CONTROL METHOD, AND NON-TRANSITORY COMPUTER READABLE MEDIUM

(71) Applicant: CANON KABUSHIKI KAISHA, Tokyo (JP)

(72) Inventor: Takahiro Kitsunai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/161,958

(22) Filed: Jan. 29, 2021

(65) Prior Publication Data
US 2021/0151001 A1    May 20, 2021

Related U.S. Application Data

(63) Continuation of application No. PCT/JP2019/029358, filed on Jul. 26, 2019.

(30) Foreign Application Priority Data

Aug. 7, 2018 (JP) .............................. JP2018-148290

(51) Int. Cl.
*G09G 5/00* (2006.01)
*G09G 5/10* (2006.01)

(52) U.S. Cl.
CPC .............. *G09G 5/006* (2013.01); *G09G 5/005* (2013.01); *G09G 5/10* (2013.01);
(Continued)

(58) Field of Classification Search
CPC ...... H04N 5/66; H04N 21/431; H04N 21/488; G09G 3/20; G09G 5/005; G09G 5/10;
(Continued)

(56) References Cited

U.S. PATENT DOCUMENTS

| 9,380,283 B2 | 6/2016 | Ko et al. |
| 9,986,253 B2 | 5/2018 | Yamamoto et al. |
| (Continued) | | |

FOREIGN PATENT DOCUMENTS

| JP | 2011-071982 A | 4/2011 |
| JP | 2012-054723 A | 3/2012 |
| (Continued) | | |

OTHER PUBLICATIONS

Oct. 18, 2019 International Search Report in International Patent Appln. No. PCT/JP2019/029358.

*Primary Examiner* — Abbas I Abdulselam
(74) *Attorney, Agent, or Firm* — Venable LLP

(57) ABSTRACT

A display control apparatus includes: a display control unit configured to perform control so as to display a target image; a determining unit configured to determine whether or not the target image is an image having a dynamic range that is wider than a predetermined range; an acquiring unit configured to acquires setting information related to whether or not a predetermined setting for displaying an image having a dynamic range that is wider than the predetermined range with a dynamic range that is wider than the predetermined range is valid; and a notification control unit configured to perform control such that, in a case where the target image is an image having a dynamic range that is wider than the predetermined range, a notification is performed with respect to whether or not the target image is being displayed with a dynamic range that is wider than the predetermined range.

20 Claims, 8 Drawing Sheets

(52) U.S. Cl.
CPC . *G09G 2320/0666* (2013.01); *G09G 2320/08* (2013.01); *G09G 2340/06* (2013.01)

(58) Field of Classification Search
CPC ............... G09G 5/006; G09G 2320/08; G09G 2320/0666; G09G 2320/0271; G09G 2340/06; G06F 3/147
See application file for complete search history.

(56) References Cited

U.S. PATENT DOCUMENTS

| | | |
|---|---|---|
| 10,412,401 B2 | 9/2019 | Yamamoto et al. |
| 10,951,909 B2 | 3/2021 | Yamamoto et al. |
| 2011/0074934 A1 | 3/2011 | Ko et al. |
| 2012/0050499 A1 | 3/2012 | Okumoto |
| 2016/0100183 A1 | 4/2016 | Yamamoto et al. |
| 2018/0199050 A1 | 7/2018 | Yamamoto et al. |
| 2018/0220101 A1* | 8/2018 | Evans .................. H04N 7/0117 |
| 2018/0241925 A1 | 8/2018 | Suzuki et al. |
| 2018/0330674 A1* | 11/2018 | Baar ...................... H05B 45/20 |
| 2018/0336846 A1* | 11/2018 | Lee ....................... G09G 3/3426 |
| 2019/0304379 A1* | 10/2019 | Pytlarz ................. G09G 3/3406 |
| 2019/0364293 A1 | 11/2019 | Yamamoto et al. |

FOREIGN PATENT DOCUMENTS

| | | |
|---|---|---|
| JP | 2015-005878 A | 1/2015 |
| JP | 2017-184206 A | 10/2017 |
| JP | 2017-220690 A | 12/2017 |
| WO | 2017/047466 A1 | 3/2017 |

* cited by examiner

DISPLAY CONTROL APPARATUS, DISPLAY CONTROL METHOD, AND NON-TRANSITORY COMPUTER READABLE MEDIUM

CROSS-REFERENCE TO RELATED APPLICATIONS

This application is a Continuation of International Patent Application No. PCT/JP2019/029358, filed Jul. 26, 2019, which claims the benefit of Japanese Patent Application No. 2018-148290, filed Aug. 7, 2018, which is hereby incorporated by reference herein in its entirety.

BACKGROUND OF THE INVENTION

Field of the Invention

The present invention relates to a display control apparatus, a display control method, and a non-transitory computer-readable medium.

Background Art

Standard display apparatuses and image formats handle image data compliant to standards such as sRGB and Rec. ITU-R BT.709. These standards specify an upper limit brightness of 80 to 100 $cd/m^2$.

In recent years, standards such as Rec. ITU-R BT.2100 have been formulated which specify a wider dynamic range (brightness range) than dynamic ranges specified in sRGB, Rec. ITU-R BT.709, and the like. For example, a transfer function called "PQ (Perceptual Quantization)" that is specified in Rec. ITU-R BT.2100 enables brightness up to 10000 $cd/m^2$ to be expressed. With the formulation of standards specifying a wide dynamic range, display apparatuses capable of displaying a wide dynamic range (for example, brightness up to 1000 $cd/m^2$) are becoming available.

A relatively wide dynamic range specified in Rec. ITU-R BT.2100 and the like is referred to as an "HDR (High Dynamic Range)" and an image with an HDR is referred to as an "HDR image". On the other hand, a relatively narrow dynamic range (a dynamic range that is narrower than the dynamic range of an HDR image) as specified in sRGB, Rec. ITU-R BT.709, and the like is referred to as an "SDR (Standard Dynamic Range)". An image with an SDR is referred to as an "SDR image".

In addition to HDR images and SDR images, there are RAW images that record, on an "as-is" basis, RAW data (raw data) obtained from an image pickup element of a Bayer array. Since a RAW image has a wider dynamic range than the dynamic range of an SDR image, performing development processing under a development condition (an HDR development parameter) for converting a RAW image into an HDR image enables an HDR image to be generated from a RAW image to be used.

Techniques related to HDR images are disclosed in, for example, PTL 1, PTL 2, and PTL 3. In the techniques disclosed in PTL 1 and PTL 2, an HDR image and conversion information (such as a tone map) from the HDR image to an SDR image are used. Specifically, when a display apparatus is capable of HDR display (display in an HDR), an HDR image is displayed on the display apparatus. On the other hand, when a display apparatus is incapable of HDR display, the HDR image is converted into an SDR image using conversion information and the SDR image is displayed on the display apparatus. Accordingly, even when a display apparatus is incapable of HDR display, an HDR image can be displayed on the display apparatus with an SDR (a dynamic range suiting capabilities of the display apparatus). In the technique disclosed in PTL 3, a determination is made as to whether an image to be displayed on a display apparatus is an HDR image or an SDR image and a determination result is displayed on the display apparatus.

In standard image adjustment work, a user performs an adjustment operation so that image quality of a display image (an image displayed on a display surface) assumes desired image quality while checking the display image. However, since display apparatuses do not necessarily perform HDR display, the user must confirm (determine) whether or not HDR display is performed when carrying out image adjustment work of an HDR image. A case will now be considered in which image adjustment work of an HDR image being displayed with an SDR is carried out without confirming whether or not HDR display is performed. In this case, adjustment not intended by the user may be performed due to reasons such as the user being unaware of the fact that a dynamic range (HDR) of the HDR image differs from a dynamic range (SDR) of the display image. In addition, when adjustment not intended by the user is performed, image adjustment work must be performed all over again. When using the technique disclosed in PTL 3, although the user can confirm whether or not an HDR image is being displayed, the user cannot confirm whether or not HDR display is being performed.

The present invention provides a technique that enables a user to readily comprehend what kind of dynamic range an image is displayed with.

CITATION LIST

Patent Literature

PTL 1 Japanese Patent Laid-Open No. 2015-5878
PTL 2 Japanese Patent Laid-Open No. 2017-220690
PTL 3 Japanese Patent Laid-Open No. 2017-184206

SUMMARY OF THE INVENTION

The present invention in its first aspect provides a display control apparatus comprising at least one memory and at least one processor which function as:

a display control unit configured to perform control so as to display a target image on a display;

a determining unit configured to determine whether or not the target image is an image having a dynamic range that is wider than a predetermined range;

an acquiring unit configured to acquires setting information related to whether or not a predetermined setting for displaying an image having a dynamic range that is wider than the predetermined range with a dynamic range that is wider than the predetermined range is valid; and a notification control unit configured to perform control such that, in a case where the target image is an image having a dynamic range that is wider than the predetermined range, a notification is performed with respect to whether or not the target image being displayed on the display is being displayed with a dynamic range that is wider than the predetermined range.

The present invention in its second aspect provides a display control apparatus comprising at least one memory and at least one processor which function as:

an acquiring unit configured to acquire HDR (High Dynamic Range) image data; and a display control unit configured to perform control so as to display, on a display, a display image having an HDR based on the HDR image data or a display image having an SDR (Standard Dynamic Range) based on SDR image data generated from the HDR image data, wherein the display control unit displays, in a case where displaying the display image having the SDR, a predetermined icon together with the display image having the SDR, and does not display, in a case where displaying the display image having the HDR, the predetermined icon together with the display image having the HDR.

The present invention in its third aspect provides a display control method comprising:

performing control so as to display a target image on a display;

determining whether or not the target image is an image having a dynamic range that is wider than a predetermined range;

acquiring setting information related to whether or not a predetermined setting for displaying an image having a dynamic range that is wider than the predetermined range with a dynamic range that is wider than the predetermined range is valid; and performing control such that, in a case where the target image is an image having a dynamic range that is wider than the predetermined range, a notification is performed with respect to whether or not the target image being displayed on the display is being displayed with a dynamic range that is wider than the predetermined range.

The present invention in its fourth aspect provides a display control method comprising:

an acquiring step of acquiring HDR (High Dynamic Range) image data; and a display control step of performing control so as to display, on a display, a display image having an HDR based on the HDR image data or a display image having an SDR (Standard Dynamic Range) based on SDR image data generated from the HDR image data, wherein in the display control step in a case where displaying the display image having the SDR, a predetermined icon is displayed together with the display image having the SDR, and in a case where displaying the display image having the HDR, the predetermined icon is not displayed together with the display image having the HDR.

The present invention in its fifth aspect provides a non-transitory computer readable medium that stores a program, wherein the program causes a computer to execute a display control method comprising:

performing control so as to display a target image on a display;

determining whether or not the target image is an image having a dynamic range that is wider than a predetermined range;

acquiring setting information related to whether or not a predetermined setting for displaying an image having a dynamic range that is wider than the predetermined range with a dynamic range that is wider than the predetermined range is valid; and performing control such that, in a case where the target image is an image having a dynamic range that is wider than the predetermined range, a notification is performed with respect to whether or not the target image being displayed on the display is being displayed with a dynamic range that is wider than the predetermined range.

The present invention in its sixth aspect provides a non-transitory computer readable medium that stores a program, wherein the program causes a computer to execute a display control method comprising:

an acquiring step of acquiring HDR (High Dynamic Range) image data; and a display control step of performing control so as to display, on a display, a display image having an HDR based on the HDR image data or a display image having an SDR (Standard Dynamic Range) based on SDR image data generated from the HDR image data, and in the display control step in a case where displaying the display image having the SDR, a predetermined icon is displayed together with the display image having the SDR, and in a case where displaying the display image having the HDR, the predetermined icon is not displayed together with the display image having the HDR.

Further features of the present invention will become apparent from the following description of exemplary embodiments with reference to the attached drawings.

DESCRIPTION OF THE EMBODIMENTS

Figure 1:
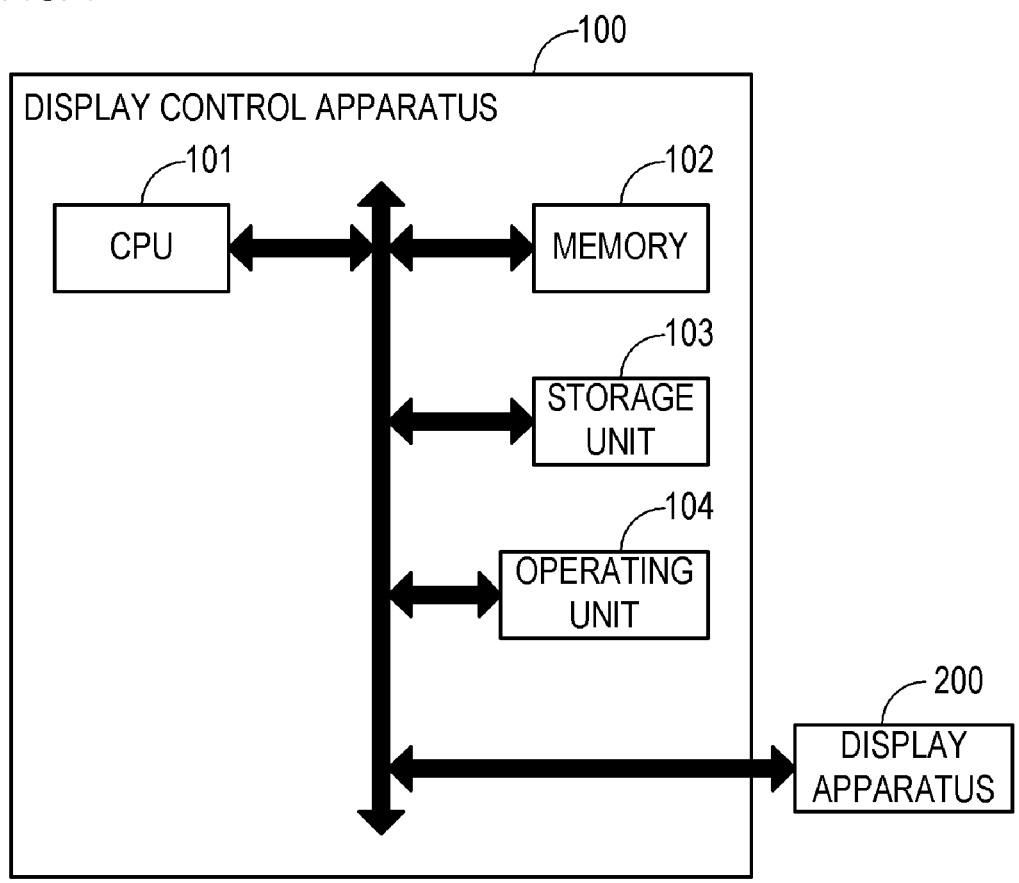
FIG. 1 is a hardware block diagram showing a schematic configuration example of a display control apparatus according to an embodiment.

Hereinafter, a preferred embodiment of the present invention will be described in detail with reference to the accompanying drawings. FIG. 1 is a hardware block diagram showing an example of a schematic configuration of a display control apparatus 100 according to the present embodiment. The display control apparatus 100 is a personal computer or the like having a CPU 101, a memory 102, a storage unit 103, and an operating unit 104, and is connected to a display apparatus 200. The display apparatus 200 is a CRT, an LCD, or the like and displays, on a display surface thereof, various screens and images including a GUI (Graphical User Interface) that assists user operations (operations performed by a user). The display control apparatus 100 controls display by the display apparatus 200. Alternatively, the display control apparatus 100 and the display apparatus 200 may be integrally configured.

The CPU 101 performs various processing steps, control, and the like of the display control apparatus 100. For example, the CPU 101 deploys a predetermined program recorded in the storage unit 103 onto the memory 102, executes the program, and outputs, to each unit of the display control apparatus 100, an instruction (a control signal) for controlling operations of the unit. Each unit of the display control apparatus 100 performs a predetermined operation in accordance with the instruction from the CPU 101.

The memory 102 stores various kinds of data, information, and the like. For example, a RAM or the like is used as the memory 102 to be used as a work memory of the CPU 101.

The storage unit 103 stores various kinds of data, information, and the like. For example, a hard disk, a ROM, or the like is used as the storage unit 103 to store image data, image editing information for image editing, and the like. The storage unit 103 may be or may not be attachable to and detachable from the display control apparatus 100.

The operating unit 104 receives user operations with respect to the display control apparatus 100. For example, a keyboard, a pointing device, or the like is used as the operating unit 104. The pointing device is a mouse, a trackball, a touch panel, or the like. The operating unit 104 may be or may not be attachable to and detachable from the display control apparatus 100.

First Example

Figure 2:
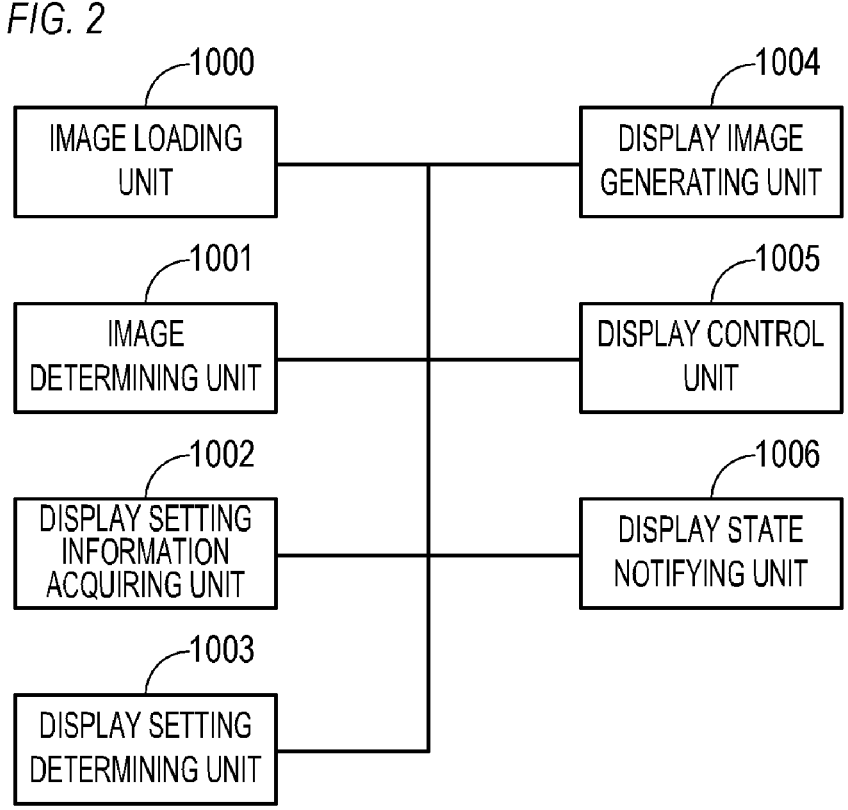
FIG. 2 is a functional block diagram showing a schematic configuration example of a display control apparatus according to a first example.

FIG. 2 is a functional block diagram showing an example of a schematic configuration of the display control apparatus 100. The display control apparatus 100 has an image loading unit 1000, an image determining unit 1001, a display setting information acquiring unit 1002, a display setting determining unit 1003, a display image generating unit 1004, a display control unit 1005, and a display state notifying unit 1006. The respective functional units shown in FIG. 2 are realized as, for example, the CPU 101 deploys a predetermined program recorded in the storage unit 103 on the memory 102 and executes the program.

The image loading unit 1000 loads (acquires) image data (an image file) of a target image to be displayed on the display apparatus 200 from the storage unit 103.

The image determining unit 1001 determines whether or not the target image (the loaded image) having been loaded by the image loading unit 1000 is an image having a dynamic range (a brightness range) that is wider than a predetermined range. Specifically, the image determining unit 1001 determines whether or not the loaded image is an image expected to be subjected to HDR (High Dynamic Range) display. For example, an image expected to be subjected to HDR display (an image having a dynamic range that is wider than a predetermined range) is an HDR image, a RAW image set so that an HDR image is to be generated by development processing, or the like. An image not expected to be subjected to HDR display (an image having a dynamic range that is narrower than the predetermined range) is an SDR (Standard Dynamic Range) image, a RAW image set so that an SDR image is to be generated by development processing, or the like. It should be noted that an image having a dynamic range with a same width as the predetermined range may either be handled as an image expected to be subjected to HDR display or an image not expected to be subjected to HDR display.

The display setting information acquiring unit 1002 acquires display setting information related to whether or not a predetermined setting (an HDR display setting) for displaying an image expected to be subjected to HDR display with an HDR (a dynamic range that is wider than a predetermined range) is valid. In the present example, due to an OS (operating system) function, the CPU 101 acquires, from the display apparatus 200, an HDR display support flag indicating whether or not the display apparatus 200 supports HDR display (whether or not HDR display is enabled on the display apparatus 200). In addition, the CPU 101 determines whether or not the display apparatus 200 supports HDR display in accordance with the HDR display support flag. When the display apparatus 200 does not support HDR display, the CPU 101 adopts OFF as the HDR display setting. When the display apparatus 200 supports HDR display, the CPU 101 switches the HDR display setting ON and OFF in accordance with a user operation or the like. In this manner, the CPU 101 sets the HDR display setting to ON or OFF and generates display setting information indicating whether the HDR display setting is ON or OFF. In addition, the display setting information acquiring unit 1002 acquires the display setting information generated inside the display control apparatus 100.

The CPU 101 may acquire display brightness information related to an upper limit display brightness (an upper limit of display brightness) of the display apparatus 200 from the display apparatus 200 and determine whether or not the display apparatus 200 supports HDR display based on the display brightness information. Whether or not the display apparatus 200 supports HDR display may also be determined based on other information. For example, the HDR display setting may be always set to ON when the display apparatus 200 supports HDR display. Therefore, the display setting information may be information (an HDR display support flag, display brightness information, or the like) which is related to whether or not the display apparatus 200 supports HDR display.

The display setting determining unit 1003 determines whether or not the HDR display setting is valid (whether or not the HDR display setting is ON) in accordance with the display setting information acquired by the display setting information acquiring unit 1002. Specifically, in a case of a loaded image expected to be subjected to HDR display, the display setting determining unit 1003 determines whether or not the HDR display setting is valid in accordance with the display setting information.

In the present example, an image expected to be subjected to HDR display is displayed with an HDR (a dynamic range that is wider than a predetermined range) when the HDR display setting is ON but displayed with an SDR (a dynamic range that is narrower than the predetermined range) when the HDR display setting is OFF. In other words, HDR display (display in an HDR) is enabled when the HDR display setting is ON but HDR display is disabled and only SDR display (display in an SDR) is enabled when the HDR display setting is OFF.

Based on a determination result of the image determining unit 1001 or the display setting determining unit 1003, the display image generating unit 1004 generates a display image (display image data) having a dynamic range that can be displayed by the display apparatus 200 at a present setting from the loaded image. For example, when the loaded image is a RAW image, the display image generating unit 1004 generates a display image such as an HDR image or an SDR image by applying development processing (debayer processing) to the loaded image. When the loaded image is an HDR image having a dynamic range that cannot be displayed by the display apparatus 200, the display image generating unit 1004 generates a display image such as an SDR image by gradation conversion processing for converting the dynamic range of the loaded image. When the loaded image has a dynamic range that can be displayed by the display apparatus 200, the display image generating unit 1004 determines the loaded image as the display image.

The display control unit 1005 controls the display apparatus 200 so as to display a target image (specifically, a display image).

The display state notifying unit 1006 performs control (notification control) so that a notification based on a determination result of the image determining unit 1001 or the display setting determining unit 1003 is performed with respect to the user. Specifically, when the loaded image is an image expected to be subjected to HDR display, the display state notifying unit 1006 performs control so that a notification based on a determination result of the display setting determining unit 1003 is performed with respect to the user. In the present example, the display state notifying unit 1006 performs control so that an icon based on a determination result of the display setting determining unit 1003 is displayed on the display apparatus 200. Accordingly, a notification is realized with respect to whether or not HDR display (display with a dynamic range that is wider than a predetermined range) of the loaded image is being performed. Methods of realizing the notification are not particularly limited. For example, the notification may be realized by outputting audio, turning a lamp on or off or causing the lamp to blink, displaying a text, displaying another graphic image, or the like, and any kind of notification may be performed as long as the user can recognize the notification.

Figure 3:
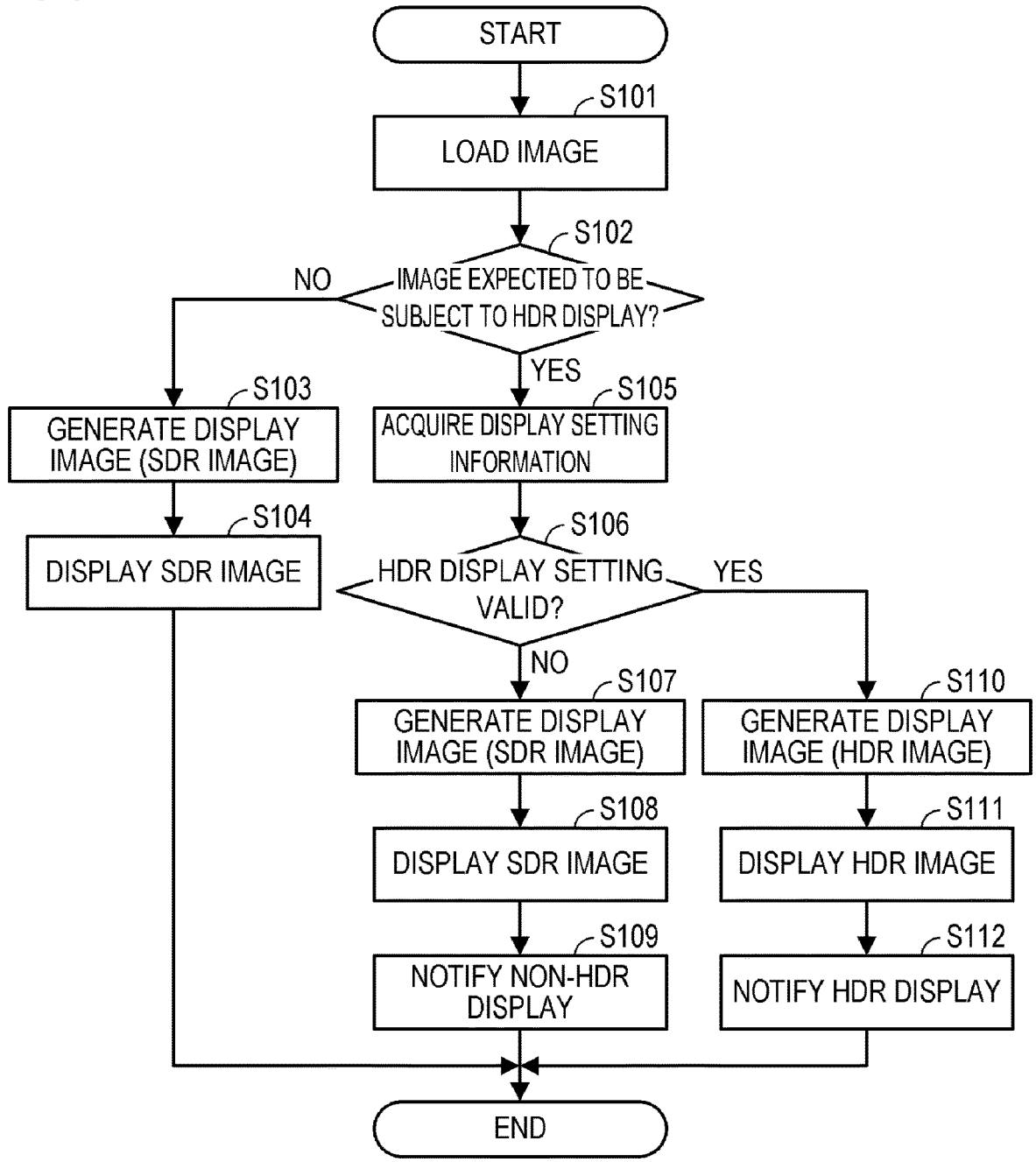
FIG. 3 is a flow chart showing an example of a processing flow of the display control apparatus according to the first example.

FIG. 3 is a flow chart showing an example of a processing flow of the display control apparatus 100.

In step S101, the image loading unit 1000 loads a target image from the storage unit 103. In step S102, the image determining unit 1001 determines whether or not the target image (loaded image) having been loaded in step S101 is an image expected to be subjected to HDR display. When it is determined that the loaded image is not an image expected to be subjected to HDR display or, in other words, when it is determined that the loaded image is an image expected to be subjected to SDR display, processing is advanced to step S103. When it is determined that the loaded image is an image expected to be subjected to HDR display, processing is advanced to step S105.

In step S103, the display image generating unit 1004 generates an SDR image as a display image from the loaded image. In step S104, the display control unit 1005 displays the SDR image generated in step S103 on the display apparatus 200.

In step S105, the display setting information acquiring unit 1002 acquires display setting information. In step S106, the display setting determining unit 1003 determines whether or not the HDR display setting is valid in accordance with the display setting information acquired in step S105. When it is determined that the HDR display setting is not valid, processing is advanced to step S107, but when it is determined that the HDR display setting is valid, processing is advanced to step S110.

Figure 6A:
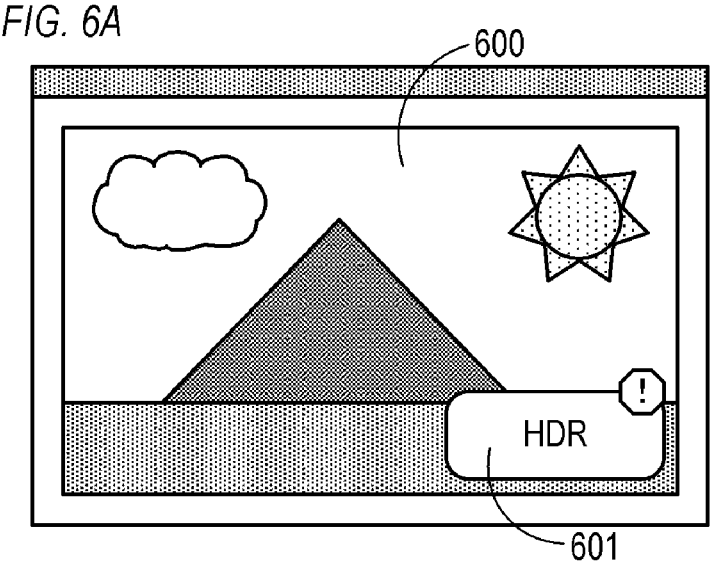
FIGS. 6A and 6B are diagrams showing examples of screens according to the first example.

In step S107, the display image generating unit 1004 generates an SDR image as a display image from the loaded image. In step S108, the display control unit 1005 displays the SDR image generated in step S107 on the display apparatus 200. In step S109, the display state notifying unit 1006 displays an icon indicating that HDR display of the loaded image is not being performed on the display apparatus 200. In step S109, for example, a screen shown in FIG. 6A is displayed. The screen in FIG. 6A displays an icon 601 on an SDR image 600. A description of "HDR" on the icon 601 indicates that the loaded image is an image expected to be subjected to HDR display, and a description of "!" on the icon 601 indicates that HDR display of the loaded image is not being performed.

Figure 6B:
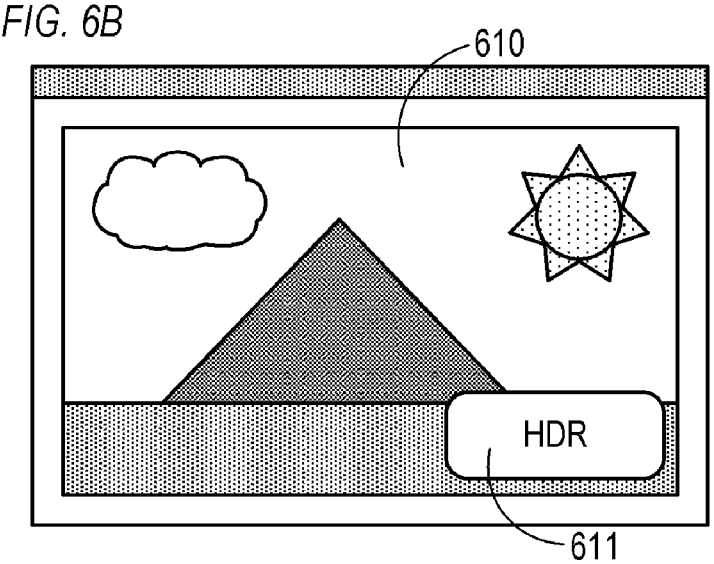

In step S110, the display image generating unit 1004 generates an HDR image as a display image from the loaded image. In step S111, the display control unit 1005 displays the HDR image generated in step S110 on the display apparatus 200. In step S112, the display state notifying unit 1006 displays an icon indicating that HDR display of the loaded image is being performed on the display apparatus 200. In step S112, for example, a screen shown in FIG. 6B is displayed. The screen in FIG. 6B displays an icon 611 on an HDR image 610. The description of "HDR" on the icon 611 indicates that the loaded image is an image expected to be subjected to HDR display, and an absence of the description of "!" on the icon 611 indicates that HDR display of the loaded image is being performed.

As described above, according to the present example, when displaying an image expected to be subjected to HDR display, a notification in accordance with whether or not HDR display setting is valid is performed. Accordingly, the user can readily comprehend whether or not HDR display is being performed, whether or not an image that is faithful to image data is being displayed, and the like. As a result, since the user can readily comprehend whether or not an image adjustment result being confirmed (visually confirmed) by image adjustment work is to be recorded, performance of adjustment not intended by the user and an occurrence of a rerun of the image adjustment work can be suppressed.

Second Example

In the first example, an example has been described in which, when displaying an image expected to be subjected to HDR display, a notification is made with respect to whether or not HDR display is being performed. However, there are a plurality of standards related to HDR images and a dynamic range of an HDR image depends on a standard of the HDR image. Therefore, when displaying an image expected to be subjected to HDR display, an image faithful to image data may not be displayed even when HDR display is performed. In consideration thereof, in the present example, a configuration (a method) of determining a display state in greater detail and notifying the user of more detailed information will be described. It should be noted that points (configurations and processing steps) that are similar to those of the first example will be omitted as appropriate and points that differ from those of the first example will be described in detail.

Figure 4:
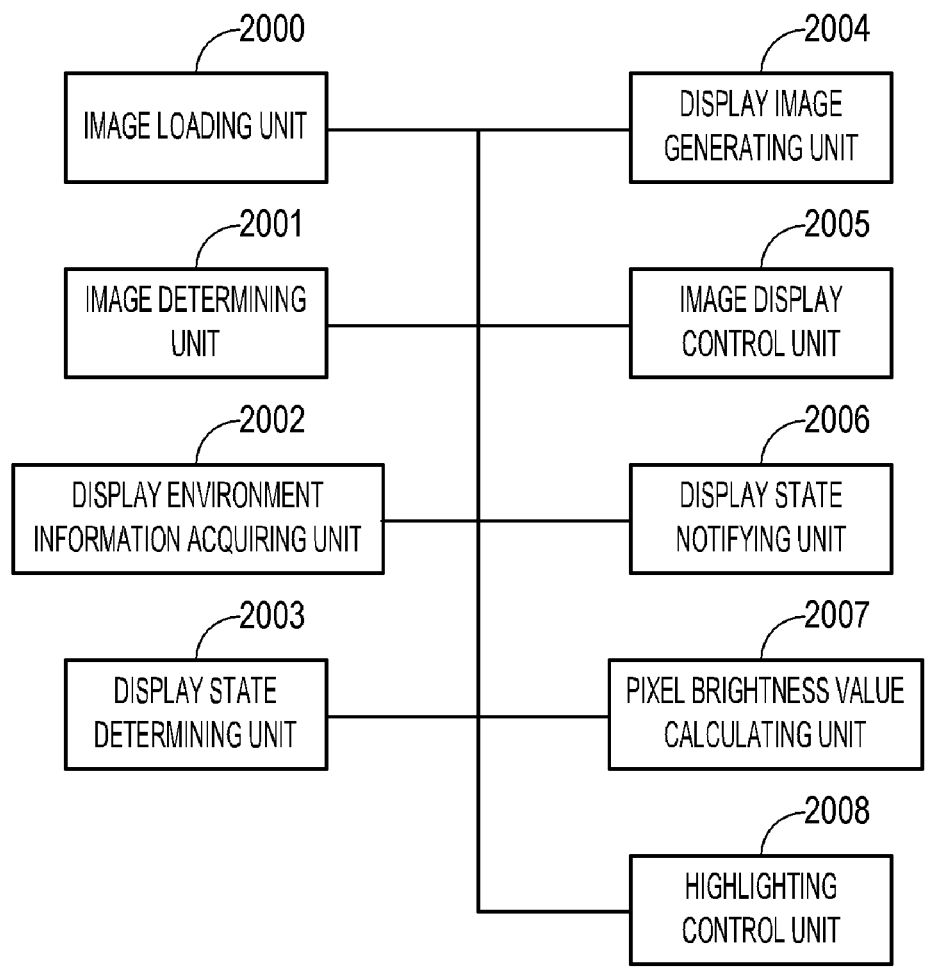
FIG. 4 is a functional block diagram showing a schematic configuration example of a display control apparatus according to a second example.

FIG. 4 is a functional block diagram showing an example of a schematic configuration of the display control apparatus 100. The display control apparatus 100 has an image loading unit 2000, an image determining unit 2001, a display environment information acquiring unit 2002, a display state determining unit 2003, a display image generating unit 2004, and an image display control unit 2005. In addition, the display control apparatus 100 has a display state notifying unit 2006, a pixel brightness value calculating unit 2007, and a highlighting control unit 2008.

The image loading unit 2000 has a similar function to the image loading unit 1000 according to the first example. The image determining unit 2001 has a similar function to the image determining unit 1001 according to the first example. The display image generating unit 2004 has a similar function to the display image generating unit 1004 according to the first example. The image display control unit 2005 has a similar function to the display control unit 1005 according to the first example.

The display environment information acquiring unit 2002 acquires display setting information in a similar manner to the display setting information acquiring unit 1002 according to the first example. In addition, the display environment information acquiring unit 2002 acquires display brightness information related to upper limit display brightness of the display apparatus 200.

The pixel brightness value calculating unit 2007 calculates, with respect to each pixel of a loaded image, a brightness value indicating brightness (brightness corresponding to a pixel value; brightness that is expected in the loaded image) of the loaded image. For example, with respect to an HDR image adopting a PQ (Perceptual Quantization) system, a brightness value can be calculated from a pixel value using the equation given below.

$$L = \left( \frac{\max[E^{\frac{1}{m_2}} - c_1, 0]}{c_2 - c_3 E^{\frac{1}{m_2}}} \right)^{\frac{1}{m_1}} \quad [\text{Math. 1}]$$

L: brightness value (a value equal to at least 0 and not more than 1; brightness value L=1 corresponds to brightness of 10000 cd/m²)
E: pixel value (a value normalized to be equal to at least 0 and not more than 1)
m1: 0.1593017578125
m2: 78.84375
c1: c3−c2+1
c2: 18.8515625
c3: 18.6875

The display state determining unit 2003 determines whether or not the HDR display setting is valid in a similar manner to the display setting determining unit 1003 according to the first example. Furthermore, the display state determining unit 2003 compares a calculation result of the pixel brightness value calculating unit 2007 and display brightness information acquired by the display environment information acquiring unit 2002 with each other. Specifically, the display state determining unit 2003 compares a maximum brightness value (a maximum value of brightness values of the respective pixels) of the loaded image and an upper limit display brightness value (brightness value indicating an upper limit display brightness) of the display apparatus 200 with each other. In addition, the display state determining unit 2003 determines a present display state based on results of the determinations and comparisons described above. Specifically, in a case of a loaded image expected to be subjected to HDR display, the display state determining unit 2003 determines any of states 1 to 3 listed below as a present display state.

State 1: HDR display setting is not valid.
State 2: HDR display setting is valid and the upper limit display brightness value of the display apparatus 200 is larger than the maximum brightness value of the loaded image (the upper limit display brightness of the display apparatus 200 is higher than the maximum brightness of the loaded image).
State 3: HDR display setting is valid and the upper limit display brightness value of the display apparatus 200 is smaller than the maximum brightness value of the loaded image (the upper limit display brightness of the display apparatus 200 is lower than the maximum brightness of the loaded image).

It should be noted that patterns of determination by the display state determining unit 2003 are not particularly limited. Any kind of determination may be made as long as a display state can be determined. A state where HDR display setting is valid and the upper limit display brightness value of the display apparatus 200 is equal to the maximum brightness value of the loaded image may either be handled as state 2 or handled as state 3. In the present example, it is assumed that a state where HDR display setting is valid and the upper limit display brightness value of the display apparatus 200 is equal to the maximum brightness value of the loaded image is to be handled as state 2.

The display state notifying unit 2006 has a similar function to the display state notifying unit 1006 according to the first example. As described above, in the present example, any of the display states represented by states 1 to 3 is determined. The display state notifying unit 2006 performs control so that different notifications are performed among states 1 to 3.

The highlighting control unit 2008 performs control so as to display a specific image region in the loaded image in an identifiable manner. For example, the specific image region is displayed highlighted by applying a specific color, causing the specific image region to blink, or the like. A case will now be considered where the loaded image is an image expected to be subjected to HDR display and the HDR display setting is valid. In the present example, due to control by the image display control unit 2005, an image region having lower brightness than the upper limit display brightness of the display apparatus 200 in the loaded image is displayed with display brightness that is substantially equal to the brightness of the loaded image. In addition, an image region having higher brightness than the upper limit display brightness in the loaded image is displayed with display brightness that is equal to or lower than the upper limit display brightness. Based on the calculation result of the pixel brightness value calculating unit 2007 and the display brightness information acquired by the display environment information acquiring unit 2002, the highlighting control unit 2008 compares a brightness value of each pixel of the loaded image and the upper limit display brightness value of the display apparatus 200 with each other. Furthermore, the highlighting control unit 2008 determines an image region of which the calculated brightness value is larger than the upper limit display brightness value (an image region having higher brightness than the upper limit display brightness) as the specific image region.

It should be noted that an image region having brightness that is equal to the upper limit display brightness may be displayed with display brightness that is substantially equal to the upper limit display brightness or displayed with display brightness that is lower than the upper limit display brightness. An image region having brightness that is equal to the upper limit display brightness may be handled as a specific image region or may not be handled as a specific image region. In the present example, it is assumed that an image region having brightness that is equal to the upper limit display brightness is not to be handled as a specific image region and is to be displayed with display brightness that is substantially equal to the upper limit display brightness.

Figure 5:
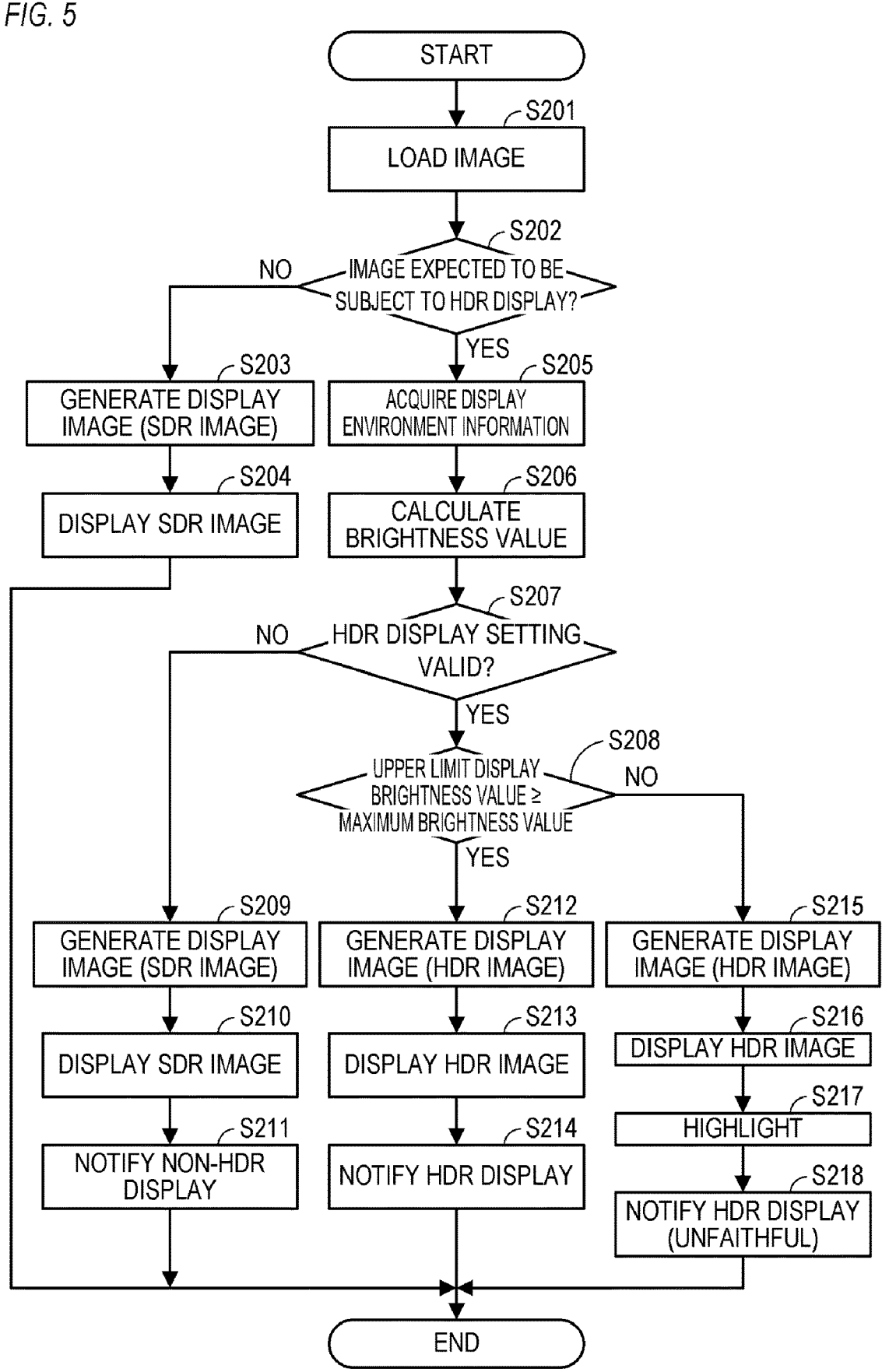
FIG. 5 is a flow chart showing an example of a processing flow of the display control apparatus according to the second example.

FIG. 5 is a flow chart showing an example of a processing flow of the display control apparatus 100.

In step S201, the image loading unit 2000 loads a target image from the storage unit 103. In step S202, the image determining unit 2001 determines whether or not the target image (loaded image) having been loaded in step S201 is an image expected to be subjected to HDR display. When it is determined that the loaded image is not an image expected to be subjected to HDR display, processing is advanced to step S203, but when it is determined that the loaded image is an image expected to be subjected to HDR display, processing is advanced to step S205.

In step S203, the display image generating unit 2004 generates an SDR image as a display image from the loaded image. In step S204, the image display control unit 2005 displays the SDR image generated in step S203 on the display apparatus 200.

In step S205, the display environment information acquiring unit 2002 acquires display environment information (display setting information and display brightness information). In step S206, the pixel brightness value calculating unit 2007 calculates a brightness value of each pixel of the loaded image. In step S207, the display state determining unit 2003 determines whether or not the HDR display setting is valid in accordance with the display setting information acquired in step S205. When it is determined that the HDR display setting is valid, processing is advanced to step S208, but when it is determined that the HDR display setting is not valid, processing is advanced to step S209. In step S208, the display state determining unit 2003 determines whether or not the upper limit display brightness value of the display apparatus 200 is equal to or larger than the maximum brightness value of the loaded image based on the display brightness information acquired in step S205 and the calculation result of step S206. When it is determined that the upper limit display brightness value is equal to or larger than the maximum brightness value (the upper limit display brightness is equal to or higher than the maximum brightness), processing is advanced to step S212. When it is determined that the upper limit display brightness value is smaller than the maximum brightness value (the upper limit display brightness is lower than the maximum brightness), processing is advanced to step S215.

Figure 7A:
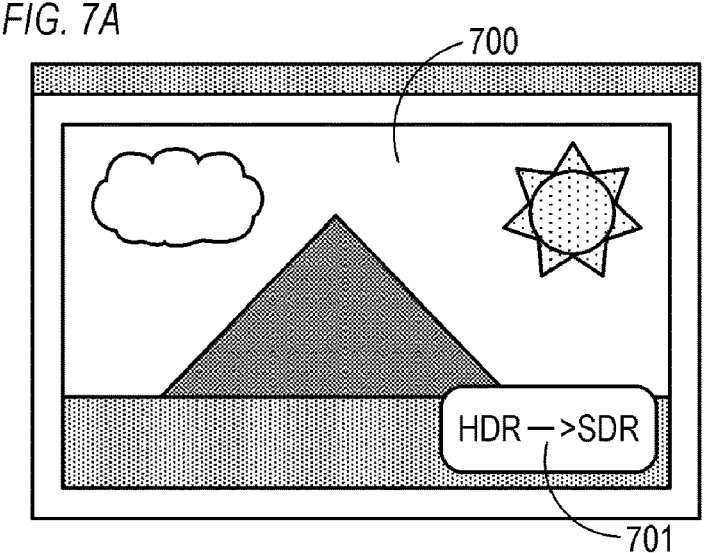
FIGS. 7A to 7C are diagrams showing examples of screens according to the second example.

In step S209, the display image generating unit 2004 generates an SDR image as a display image from the loaded image. In step S210, the image display control unit 2005 displays the SDR image generated in step S209 on the display apparatus 200. In step S211, the display state notifying unit 2006 displays an icon indicating that HDR display of the loaded image is not being performed on the display apparatus 200. In step S211, for example, a screen shown in FIG. 7A is displayed. The screen in FIG. 7A displays an icon 701 on an SDR image 700. A description of "HDR→SDR" on the icon 701 indicates that SDR display of the loaded image expected to be subjected to HDR display is being performed, the loaded image expected to be subjected to HDR display is displayed after being converted into an SDR image, and the like.

Figure 7B:
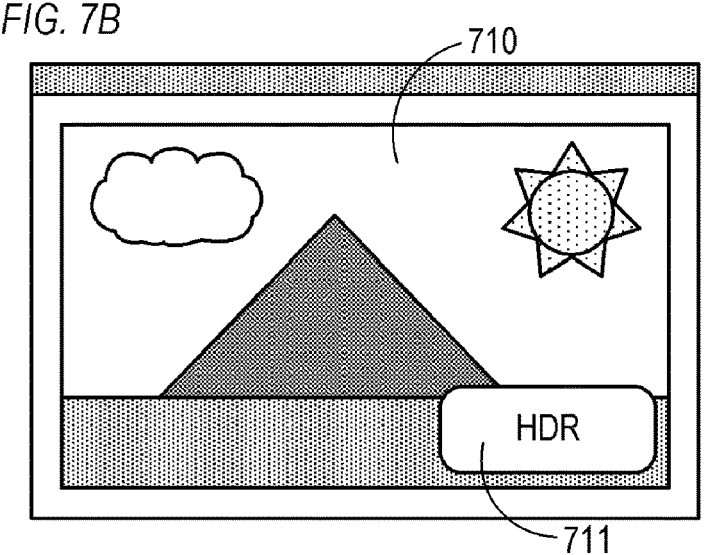

In step S212, the display image generating unit 2004 generates an HDR image as a display image from the loaded image. In step S213, the image display control unit 2005 displays the HDR image generated in step S212 on the display apparatus 200. In step S214, the display state notifying unit 2006 displays an icon indicating that HDR display of the loaded image is being performed (the loaded image is being displayed with a dynamic range of the loaded image) on the display apparatus 200. In step S214, for example, a screen shown in FIG. 7B is displayed. The screen in FIG. 7B displays an icon 711 on an HDR image 710. The fact that only "HDR" is described on the icon 711 indicates that the loaded image is an image expected to be subjected to HDR display, HDR display of the loaded image is being performed, the loaded image is being displayed with the dynamic range of the loaded image, and the like.

Figure 7C:
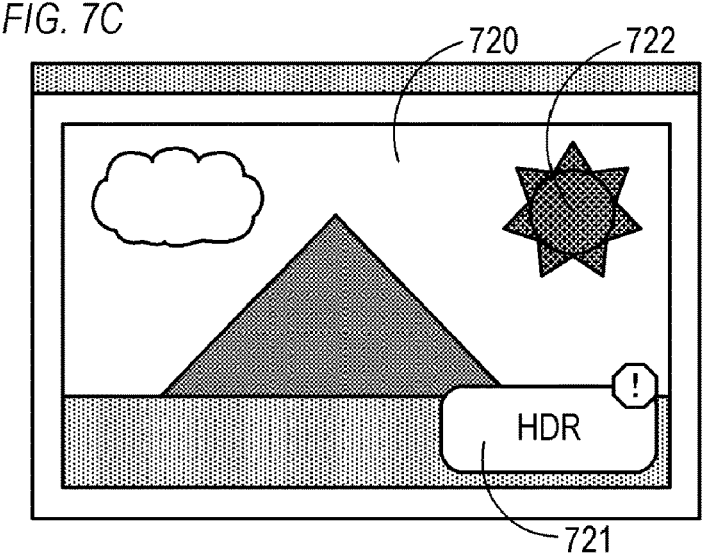

In step S215, the display image generating unit 2004 generates an HDR image as a display image from the loaded image. In this case, the HDR image is generated by converting a brightness value that is larger than the upper limit display brightness value into a brightness value that is equivalent to the upper limit display brightness value (converting brightness that is higher than the upper limit display brightness into brightness that is equivalent to the upper limit display brightness) (clipping processing). In step S216, the image display control unit 2005 displays the HDR image generated in step S215 on the display apparatus 200. In step S217, the highlighting control unit 2008 highlights an image region of which the brightness value calculated in step S206 is larger than the upper limit display brightness value in the HDR image displayed in step S216. In step S218, the display state notifying unit 2006 displays, on the display apparatus 200, an icon indicating that HDR display of the loaded image is being performed but the loaded image is not being displayed with a dynamic range of the loaded image. In step S218, for example, a screen shown in FIG. 7C is displayed. The screen in FIG. 7C displays an icon 721 on an HDR image 720. A description of "HDR" on the icon 721 indicates that the loaded image is an image expected to be subjected to HDR display, HDR display of the loaded image is being performed, and the like. In addition, a description of "!" on the icon 721 indicates that the loaded image is not being displayed with the dynamic range of the loaded image. Furthermore, a sun 722 of the HDR image 720 is highlighted on the screen in FIG. 7C. Accordingly, it is indicated that display brightness of the sun 722 is limited (the display brightness of the sun 722 is not faithful to brightness of the loaded image), display brightness of an image region other than the sun 722 is not limited, and the like.

As described above, according to the present example, by further comparing the upper limit display brightness value and each brightness value of the loaded image, a display state can be determined in greater detail and the user can be notified of more specific information. Accordingly, the user can readily and accurately comprehend whether or not HDR display is being performed, whether or not an image that is faithful to image data is being displayed, and the like. As a result, since the user can readily and accurately comprehend whether or not an image adjustment result being confirmed (visually confirmed) by image adjustment work is to be recorded, performance of adjustment not intended by the user and an occurrence of a rerun of the image adjustment work can be more accurately suppressed.

Each functional unit according to the first and second examples may or may not be individual hardware. Functions of two or more functional units may be realized by common hardware. Each of a plurality of functions of a single functional unit may be realized by individual hardware. Two or more functions of a single functional unit may be realized by common hardware. In addition, each functional unit may or may not be realized by hardware. For example, an apparatus may include a processor and a memory storing a control program. Furthermore, functions of at least a part of the functional units included in the apparatus may be realized by having the processor read the control program from the memory and execute the control program.

It should be noted that the first and second examples are merely examples and that configurations obtained by appropriately modifying or altering the configurations of the first and second examples without departing from the spirit and scope of the present invention are also included in the present invention. Configurations obtained by appropriately combining the configurations of the first and second examples are also included in the present invention.

Figure 8A:
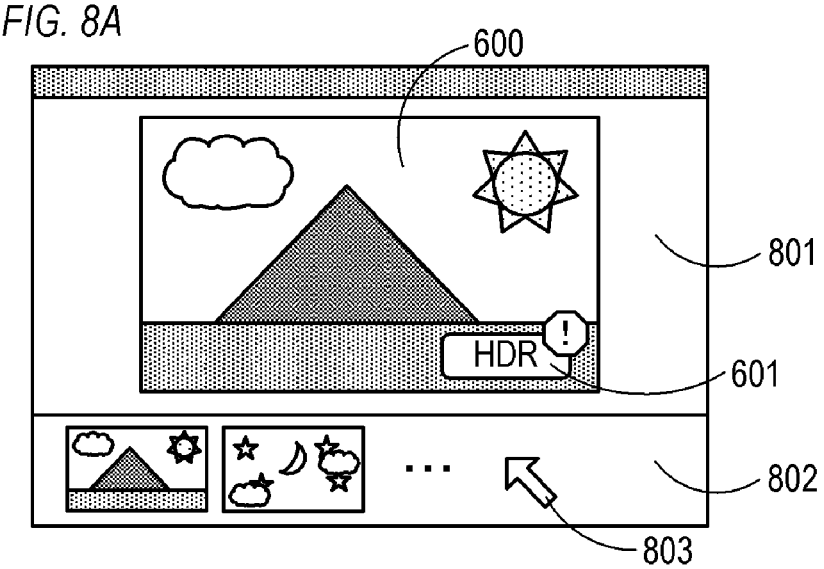
FIGS. 8A and 8B are diagrams showing examples of screens according to modifications.

For example, as control for displaying a target image, the CPU 101 may perform control for displaying a screen such as that shown in FIG. 8A. The screen in FIG. 8A includes screen regions 801 and 802. The screen region 801 is a region for HDR display which is a region where the target image is to be displayed. The screen region 802 is a region for SDR display which is a region where, for example, a thumbnail image is to be displayed, a text is to be displayed, or the like.

Figure 8B:
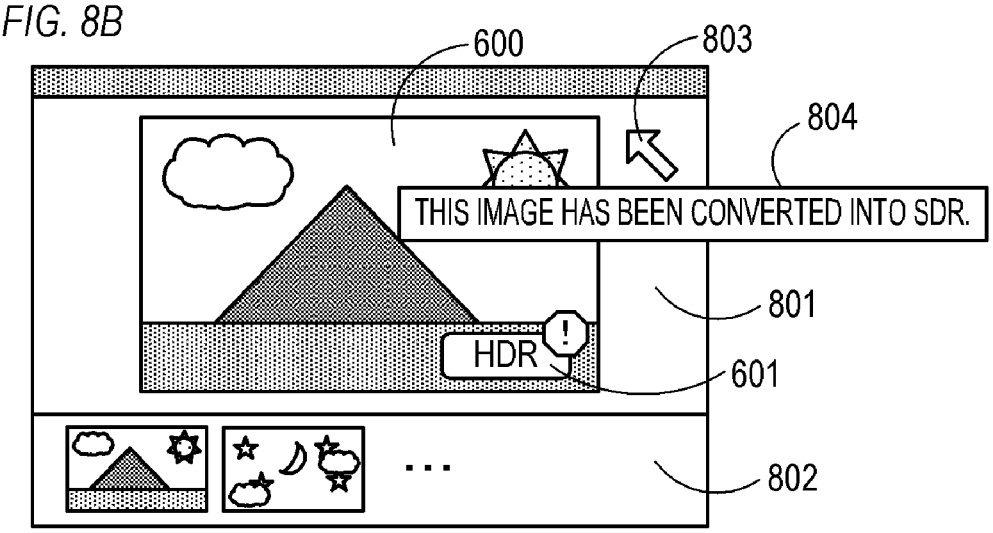

In addition, when the target image is an image expected to be subjected to HDR display and an HDR display setting is not valid, the CPU 101 may perform control so that an additional notification is made in a state where the screen region 801 is being designated by the user. For example, as shown in FIG. 8B, a state where the screen region 801 is designated is a state where a cursor 803 such as a mouse is present in the screen region 801. In addition, the additional notification is realized by displaying a text 804 or the like which more directly indicates that SDR display of the target image expected to be subjected to HDR display is being performed. The text 804 is not displayed in a state where the cursor 803 is present in the screen region 802 as shown in FIG. 8A.

The present disclosure enables a user to readily comprehend what kind of dynamic range an image is displayed with.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control apparatus comprising:
   at least one memory and at least one processor which function as a plurality of units comprising:
   (1) a display control unit configured to perform control so as to display a target image on a display;
   (2) a determining unit configured to determine whether or not the target image is an image having a dynamic range that is wider than a predetermined range;
   (3) an acquiring unit configured to acquire setting information related to whether or not a predetermined setting for displaying an image having a dynamic range that is wider than the predetermined range with a dynamic range that is wider than the predetermined range is valid; and
   (4) a notification control unit configured to perform control such that, in a case where the target image is an image having a dynamic range that is wider than the predetermined range, a notification is performed with respect to whether or not the target image being displayed on the display is being displayed with a dynamic range that is wider than the predetermined range.

2. The display control apparatus according to claim 1, wherein the notification control unit (a) performs control such that a first notification is performed in a case where the target image is an image having a dynamic range that is wider than the predetermined range and the predetermined setting is not valid, and (b) performs control such that a second notification is performed in a case where the target image is an image having a dynamic range that is wider than the predetermined range and the predetermined setting is valid.

3. The display control apparatus according to claim 2, wherein the display control unit performs control so as to display a screen including (a) a first screen region which is used for display with a dynamic range that is wider than the predetermined range and in which the target image is to be displayed and (b) a second screen region which is used for display with a dynamic range that is narrower than the predetermined range, and
   wherein the notification control unit performs control such that a fourth notification is further performed in a state where the first screen region is being designated by a user in a case where the target image is an image having a dynamic range that is wider than the predetermined range and the predetermined setting is not valid.

4. The display control apparatus according to claim 1, wherein the acquiring unit acquires the setting information and brightness information related to an upper limit display brightness, and
   wherein the notification control unit (a) performs control such that a first notification is performed in a case where the target image is an image having a dynamic range that is wider than the predetermined range and the predetermined setting is not valid, (b) performs control such that a second notification is performed in a case where the target image is an image having a dynamic range that is wider than the predetermined range, the predetermined setting is valid, and the upper limit display brightness is higher than a maximum brightness of the target image, and (c) performs control such that a third notification is performed in a case where the target image is an image having a dynamic range that is wider than the predetermined range, the predetermined setting is valid, and the upper limit display brightness is lower than the maximum brightness of the target image.

5. The display control apparatus according to claim 1, wherein the at least one memory and the at least one processor further function as a generating unit configured to generate a display image having a displayable dynamic range that can be displayed from the target image.

6. The display control apparatus according to claim 5, wherein the generating unit generates the display image by applying development processing to the target image in a case where the target image is a RAW image.

7. The display control apparatus according to claim 5, wherein the generating unit generates the display image by gradation conversion processing of converting a dynamic range of the target image in a case where the target image is an HDR (High Dynamic Range) image having an undisplayable dynamic range.

8. The display control apparatus according to claim 1, wherein the acquiring unit acquires the setting information and brightness information related to upper limit display brightness, and
    wherein in a case where the target image is an image having a dynamic range that is wider than the predetermined range and the predetermined setting is valid, the display control unit performs control such that a first image region having lower brightness than the upper limit display brightness in the target image is displayed with display brightness that is substantially equal to the brightness of the target image and a second image region having higher brightness than the upper limit display brightness in the target image is displayed so as to be identifiable.

9. The display control apparatus according to claim 1, wherein the notification control unit performs control such that the notification is realized by displaying an icon based on the setting information.

10. The display control apparatus according to claim 1, wherein an image having a dynamic range that is wider than the predetermined range is a RAW image or an HDR (High Dynamic Range) image, and
    wherein an image having a dynamic range that is narrower than the predetermined range is an SDR (Standard Dynamic Range) image.

11. A display control apparatus comprising:
    at least one memory and at least one processor which function as a plurality of units comprising:
    (1) an acquiring unit configured to acquire HDR (High Dynamic Range) image data; and
    (2) a display control unit configured to perform control so as to display, on a display, (a) a display image having an HDR based on the HDR image data or (b) a display image having an SDR (Standard Dynamic Range) based on SDR image data generated from the HDR image data,
    wherein the display control unit (a) displays, in a case of displaying the display image having the SDR, an icon indicating that HDR display of the display image is not being performed, together with the display image having the SDR, and (b) does not display, in a case of displaying the display image having the HDR, the icon together with the display image having the HDR.

12. The display control apparatus according to claim 11, wherein in a case where the display does not support the HDR display, the display control unit performs control so as to display, on the display, only the display image having the SDR from among (a) the display image having the SDR and (b) the display image having the HDR.

13. The display control apparatus according to claim 12, wherein in a case where the display supports the HDR display, the display control unit performs control so as to display, on the display, only the display image having the HDR from among (a) the display image having the SDR and (b) the display image having the HDR.

14. The display control apparatus according to claim 13, wherein in a case where an HDR display setting of the display is ON, the display control unit performs control so as to display, on the display, only the display image having the HDR from among (a) the display image having the SDR and (b) the display image having the HDR.

15. The display control apparatus according to claim 14, wherein in a case where an HDR display setting of the display is OFF, the display control unit performs control so as to display, on the display, only the display image having the SDR from among (a) the display image having the SDR and (b) the display image having the HDR.

16. The display control apparatus according to claim 11, wherein in a case where a cursor is present in a region, where the display image having the SDR is displayed, of the display, the display control unit performs control so as to display text indicating that SDR display of the display image is being performed.

17. A display control method comprising:
    performing control so as to display a target image on a display;
    determining whether or not the target image is an image having a dynamic range that is wider than a predetermined range;
    acquiring setting information related to whether or not a predetermined setting for displaying an image having a dynamic range that is wider than the predetermined range with a dynamic range that is wider than the predetermined range is valid; and
    performing control such that, in a case where the target image is an image having a dynamic range that is wider than the predetermined range, a notification is performed with respect to whether or not the target image being displayed on the display is being displayed with a dynamic range that is wider than the predetermined range.

18. A display control method comprising:
    an acquiring step of acquiring HDR (High Dynamic Range) image data; and
    a display control step of performing control so as to display, on a display, (a) a display image having an HDR based on the HDR image data or a display image having an SDR (Standard Dynamic Range) based on SDR image data generated from the HDR image data,
    wherein in the display control step, (a) in a case of displaying the display image having the SDR, an icon indicating that HDR display of the display image is not being performed is displayed together with the display image having the SDR, and (b) in a case of displaying the display image having the HDR, the icon is not displayed together with the display image having the HDR.

19. A non-transitory computer-readable medium that stores a program, wherein the program causes a computer to execute a display control method comprising:
    performing control so as to display a target image on a display;

determining whether or not the target image is an image having a dynamic range that is wider than a predetermined range;

acquiring setting information related to whether or not a predetermined setting for displaying an image having a dynamic range that is wider than the predetermined range with a dynamic range that is wider than the predetermined range is valid; and performing control such that, in a case where the target image is an image having a dynamic range that is wider than the predetermined range, a notification is performed with respect to whether or not the target image being displayed on the display is being displayed with a dynamic range that is wider than the predetermined range.

20. A non-transitory computer-readable medium that stores a program, wherein the program causes a computer to execute a display control method comprising:

an acquiring step of acquiring HDR (High Dynamic Range) image data; and a display control step of performing control so as to display, on a display, (a) a display image having an HDR based on the HDR image data or (b) a display image having an SDR (Standard Dynamic Range) based on SDR image data generated from the HDR image data, and in the display control step, (a) in a case of displaying the display image having the SDR, an icon indicating that HDR display of the display image is not being performed is displayed together with the display image having the SDR, and (b) in a case of displaying the display image having the HDR, the icon is not displayed together with the display image having the HDR.

* * * * *